Figure 1:
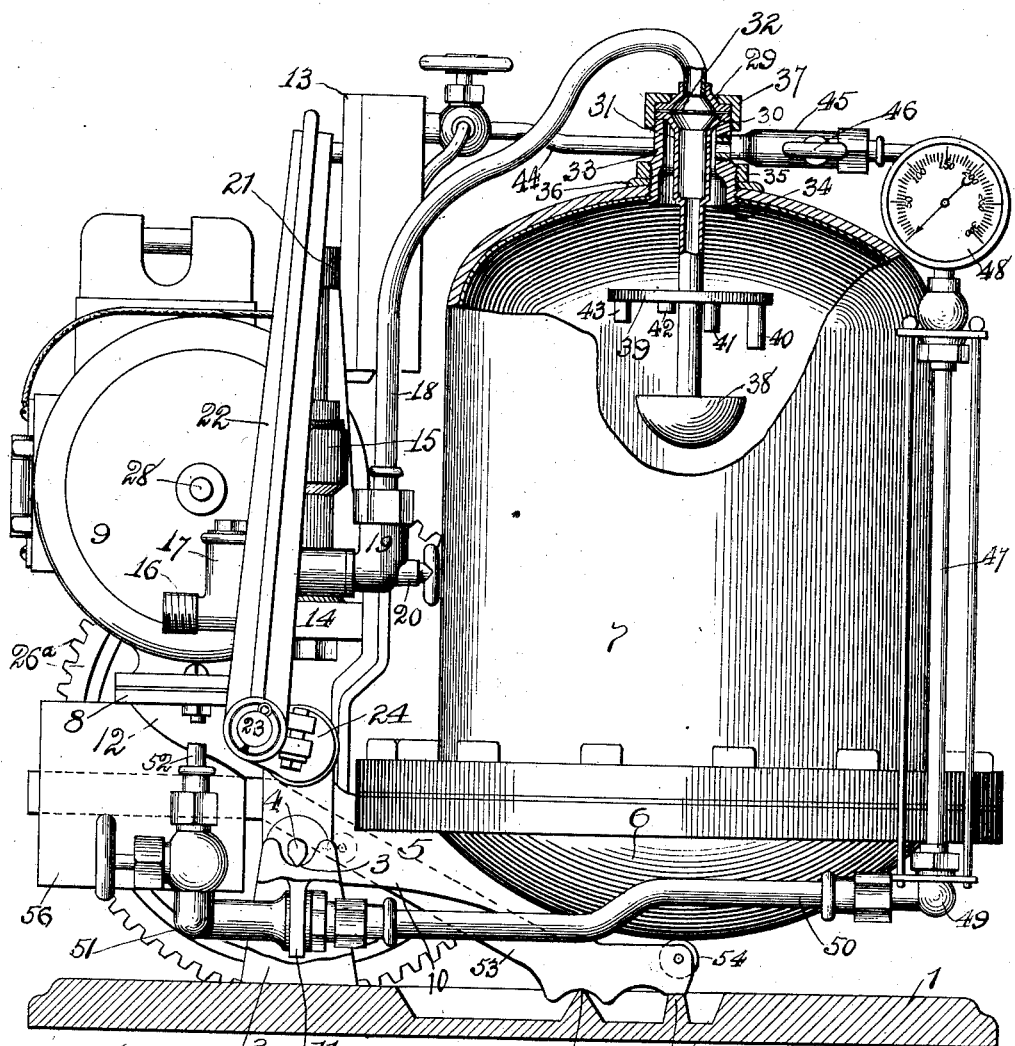

R. MUELLER.
APPARATUS FOR CARBONATING LIQUIDS.
APPLICATION FILED JULY 1, 1910.

1,043,127.

Patented Nov. 5, 1912.

4 SHEETS—SHEET 1.

R. MUELLER.
APPARATUS FOR CARBONATING LIQUIDS.
APPLICATION FILED JULY 1, 1910.
1,043,127.
Patented Nov. 5, 1912.
4 SHEETS—SHEET 2.
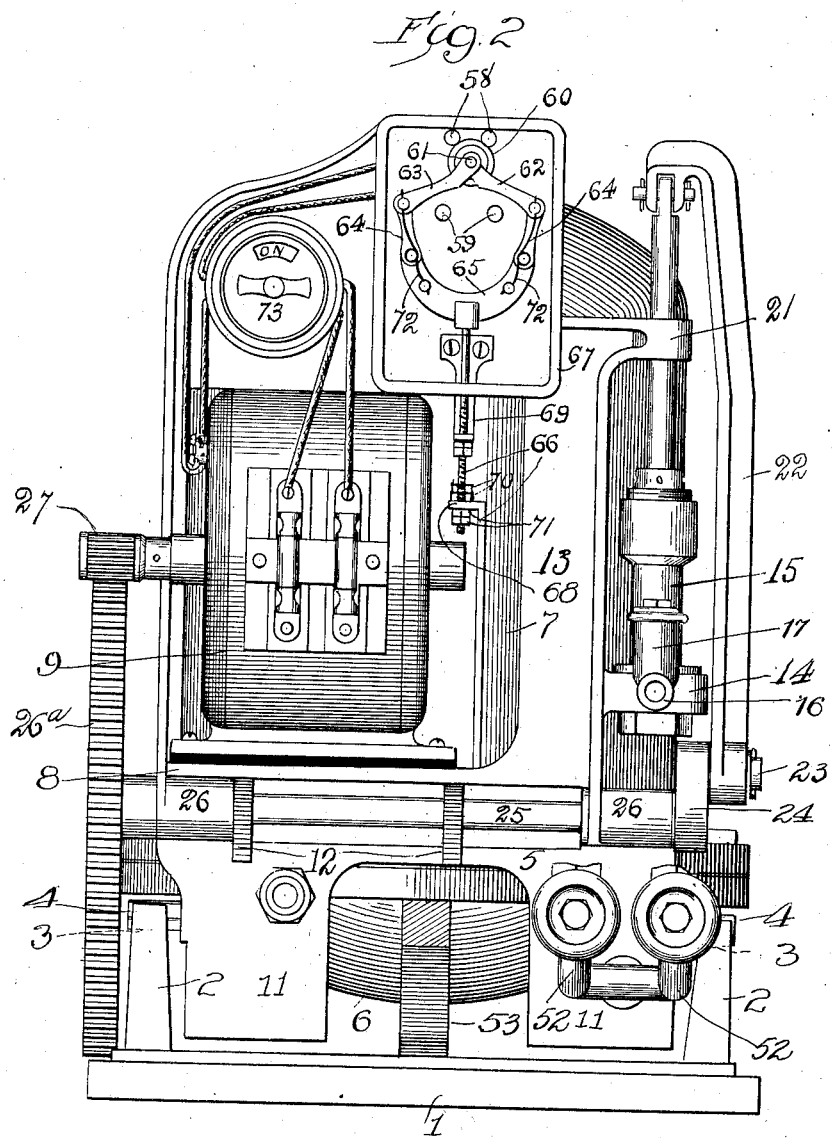

R. MUELLER.
APPARATUS FOR CARBONATING LIQUIDS.
APPLICATION FILED JULY 1, 1910.
1,043,127.
Patented Nov. 5, 1912.
4 SHEETS—SHEET 3.
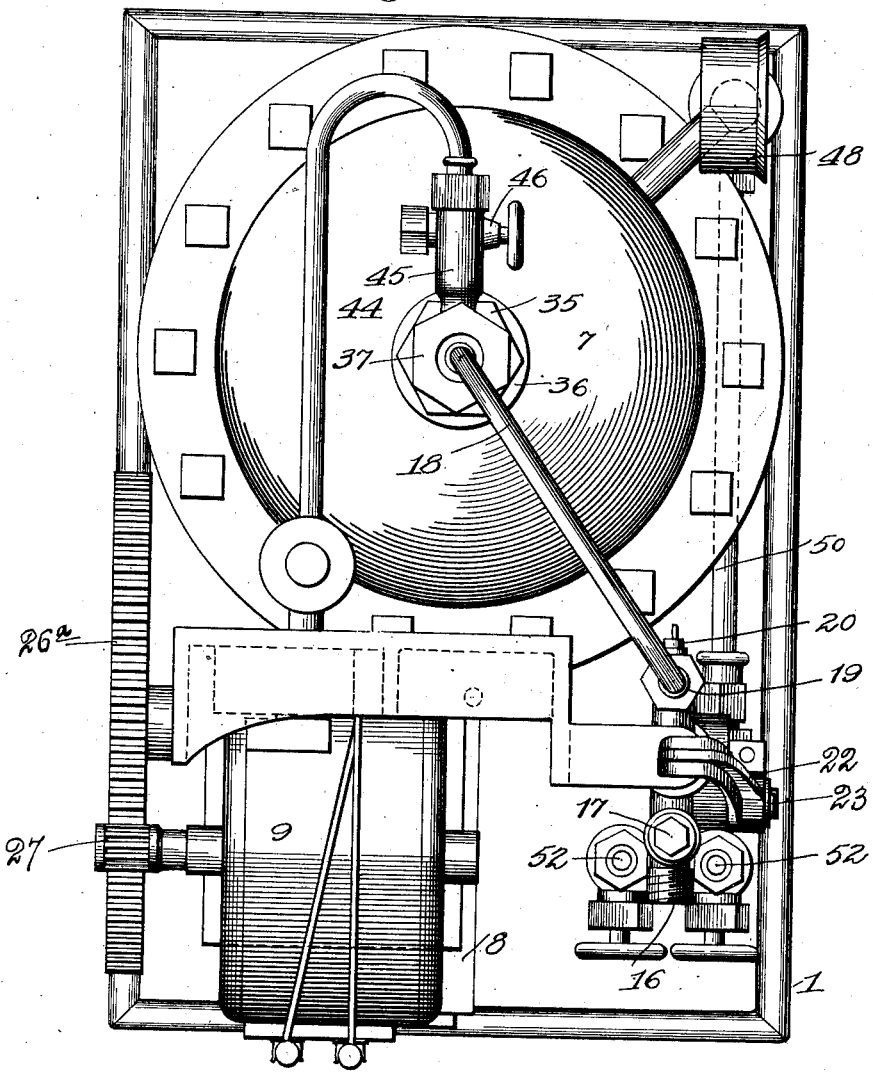

R. MUELLER.
APPARATUS FOR CARBONATING LIQUIDS.
APPLICATION FILED JULY 1, 1910.
1,043,127.
Patented Nov. 5, 1912.
4 SHEETS—SHEET 4.
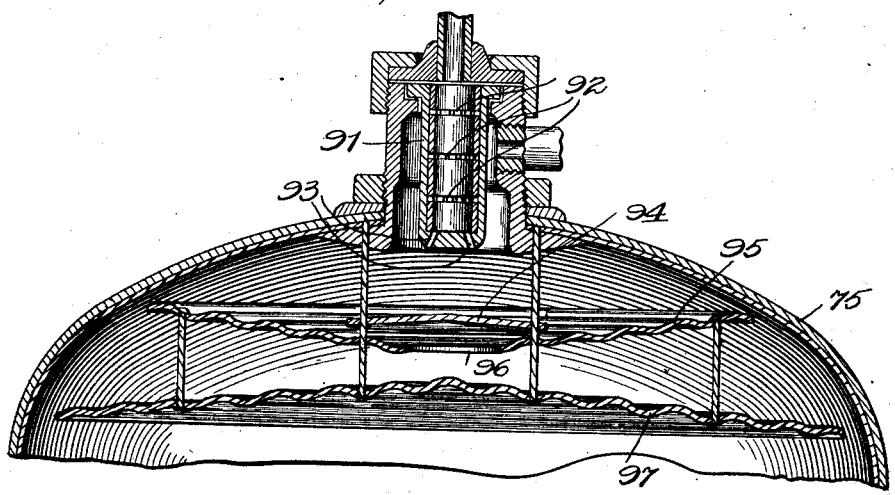
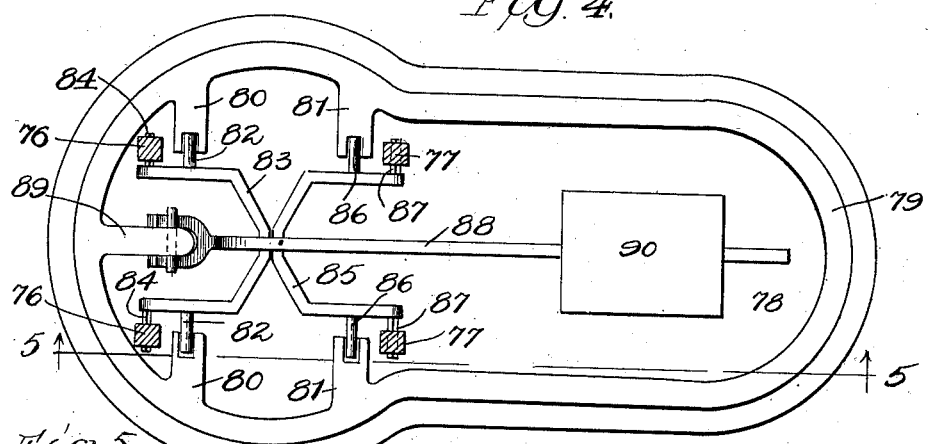
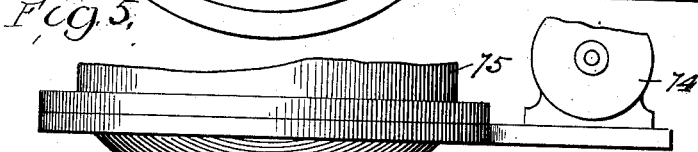
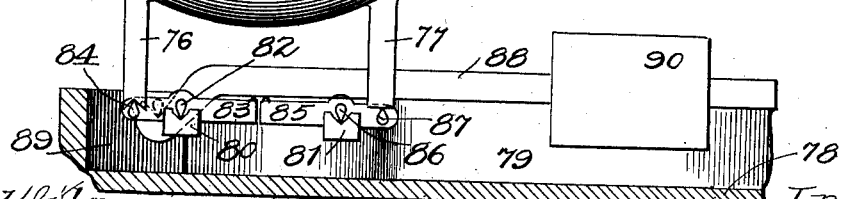

UNITED STATES PATENT OFFICE.

RUDOLPH MUELLER, OF CHICAGO, ILLINOIS.

APPARATUS FOR CARBONATING LIQUIDS.

1,043,127.  Specification of Letters Patent.  Patented Nov. 5, 1912.

Application filed July 1, 1910. Serial No. 570,025.

*To all whom it may concern:*

Be it known that I, RUDOLPH MUELLER, citizen of the United States, residing at Chicago, in the county of Cook and State of Illinois, have invented certain new and useful Improvements in Apparatus for Carbonating Liquids; and I do hereby declare the following to be a full, clear, and exact description of the invention, such as will enable others skilled in the art to which it appertains to make and use the same.

This invention has for its object to provide an improved automatic carbonator for liquids which is simple, durable and efficient, and consists in the novel features of construction and combinations of parts hereinafter fully described and claimed.

In the accompanying drawings illustrating this invention: Figure —1— is a view in side elevation of an apparatus constructed in accordance with my invention. Fig. —2— is a front elevation of the same. Fig. —3— is a top plan view of the same. Fig. —4— is a plan view partly in section showing a modified form of construction. Fig. —5— is a central vertical section on the line 5—5 of Fig. —4—. Fig. —6— is a fragmentary detail sectional view showing a modification in construction.

My invention relates to that class of carbonating apparatus which is most commonly employed at soda fountains to maintain a constant supply of freshly carbonated water for consumption, relatively small quantities of the latter being carbonated at intervals the frequency of which is automatically governed by the rapidity of consumption. Carbonators of this class are generally electrically actuated but gravity controlled, my present apparatus being similarly actuated and controlled as affording the most convenient means for attaining the desired results, my invention residing in certain details of construction in the gravity actuated controlling means, and further in certain details of construction of the carbonator proper whereby the apparatus is rendered more efficient, reliable and positive than existing apparatus of a similar type.

The particular objects sought to be attained are partly explained in the preceding paragraph, further objects being to provide an apparatus which is very compact so as to occupy minimum space; relatively inexpensive, and which, furthermore, is exceedingly simple and consequently operable by unskilled persons without danger, or liability to disorder.

The apparatus comprises the base 1 preferably of cast metal equipped with a pair of standards 2 in the upper ends of which are recesses 3 in which the knife edges of the pivots 4 of a rocking member 5 are received and supported. The said rocking member 5 comprises the dished bottom 6 of the carbonator to which the upper or hood portion 7 is bolted in a well-known manner, and a platform 8 upon which the motor 9 is mounted, said bottom 6 and platform 8 being disposed on respectively opposite sides of the pivotal axis, so that the motor and its accessory parts serve to partly counterbalance the weight of the carbonator. The dished bottom 6 of the carbonator and said platform 8 preferably constitute parts of a single casting which includes the ribs 10 connecting said bottom with transverse flanges 11 from which said pivots 4 project and which in turn are connected by transversely disposed ribs 12 with the flange 8 to support and reinforce the latter. The said flanges 11 meet in a plate 13 constituting a superstructure upon which the automatic and a manually operated electric switch respectively, are supported, and which also carries the bracket supporting the pump, and a bearing for the pump plunger, all of which are hereinafter fully described. The bracket 14 upon which the pump barrel 15 is mounted is preferably integral with said plate 13. The said pump barrel is connected at its inlet end with a source of supply of water by means of a pipe 16 in which a check valve 17 is interposed and at its delivery end is connected with the hood 7 of the carbonator by means of a pipe 18 in which a check valve 19 is interposed, the latter being equipped with a vent cock 20 to exhaust air from the pump in the event that it should become air bound. The plunger of the pump is connected by means of the piston rod passing through the bearing 21 on said plate 13 with the pitman 22, the latter connecting at its other end with the crank pin 23 of the crank 24 on the shaft 25 journaled in bearings 26 formed in the said casting and disposed between the flanges 11 and said plate 13, the latter being slotted between said bearings 26. Upon the other end of the said shaft 25 there is mounted a relatively large spur gear 26ᵃ which meshes with the spur pinion 27 on the motor shaft 28. The said pipe 18 connects at its delivery end with a flaring annularly flanged member 29 between which and the flaring annularly flanged end 30 of a tube 31 a strainer 32 is interposed, said flange of said flaring member 30 resting upon the upper edge of a substantially cylindrical member 33 provided at its lower end with an annular flange 34 bearing against the inner face of the crown of the hood of the carbonator, the latter being provided with a threaded central opening through which the lower annular enlarged portion of said member 33 passes, the latter being externally threaded on said enlarged portion to fit the threaded central opening in said crown. A nut 35 on said threaded portion of said member 33 engages the flange 36 on said crown surrounding the opening therein to secure said member 33 in position and provide a fluid tight joint between the same and said crown. Said member 33 is also externally threaded on its upper end portion to receive the union nut 37 between the flange of which and the upper end of said member 33 the said flanges of said members 29 and 30 are confined. It will be understood, of course, that gaskets are employed wherever required to render the joints thus effected fluid tight. The said tube 31 terminates at its lower end in a substantially semi-spherical nozzle 38 the upper face of which is flat and is provided with suitable perforations for the discharge of liquid therefrom. Mounted on said tube 31 between its ends is a ring 39 provided with a plurality of downwardly extending projections 40, 41, 42 and 43 all of different lengths; the lower face of each thereof being disposed in the path of a jet of liquid discharged from said nozzle 38 and serving to produce fan like sprays of liquid in a very finely divided state. By making said projections 40–43 inclusive (the number of which may obviously be increased or diminished as desired) of different lengths the respective fan like sprays produced are disposed at different elevations so that they do not meet in a given plane and thus produce large drops or streams of liquid but are maintained separate and distinct and thus cause the liquid to remain more finely divided from the time it strikes the said respective projections until it drops into the bottom of the carbonator. Carbonic acid gas in introduced into the carbonator through the tube 44 equipped with a suitable discharge nozzle 45 entering the said member 33 between the ends thereof, said nozzle being equipped with a blow off cock 46 as usual. The said carbonator is maintained constantly filled with carbonic acid gas under pressure and the liquid in finely divided state is subjected to the action of said gas that is, it is presented to the gas in the condition best adapting it to absorb said gas and thus become highly carbonated. Mounted on said receptacle in a usual and well-known manner is a water gage glass 47 communicating with the upper end portion of said receptacle and with a pressure gage 48, and at its other end communicating with a coupling 49 connecting the lower end of the carbonator with the delivery pipe 50 for carbonated liquid, the latter passing through one of said flanges 11 and terminating in a branch pipe 51 which in turn communicates with any desired number of valve controlled delivery pipes 52. The said pipe 44 also passes at one end through one of said flanges 11 and is there connected with the source of supply of carbonic acid gas in the usual manner. It will be obvious, of course, in view of the fact that the said flanges 11 move relatively to the base 1 that the said connections for the inlet of liquid and gas and the discharge of carbonated liquid must of necessity include a flexible member.

As previously stated the motor and some of its accessory parts serve to partially counterbalance the weight of the carbonator, the latter being, however, very much heavier even when empty at least to the extent that by reason of its greater projection from the supporting pivot it exerts a greater leverage. It is obviously necessary that the motor circuit should be controlled by a switch actuated by movement of the carbonator or motor relatively to the base 1. The switch employed should be of a quick acting nature so as to effect very sudden opening and closure of the electric circuit so as to prevent the possibility of drawing an arc and thereby burning away the coacting contact surfaces effecting closure of the circuit. To successfully accomplish this the circuit closure should have a relatively long stroke and, as previously stated, should be very suddenly and instantaneously moved either into circuit closing or circuit opening position. To accomplish this I provide a counterbalancing lever 53 equipped at one end with an antifriction roller 54 bearing upon the lowermost point in the dished bottom 6 of the carbonator and which is supported between its ends upon the knife edge pivot 55 on the base 1, said lever being equipped at its other end with an adjustable counterweight 56. The pivotal support for said lever is disposed very much nearer the antifriction roller end of the lever than the counterweighted end thereof so that the counterweight will exert a relatively great lifting power to overcome the weight of the carbonator, the downward movement of the latter and the antifriction roller end of said lever being limited by a stop 57 on said base 1.

Mounted on the plate 13 is a pair of terminals 58 to which the ends of a severed wire of the circuit are respectively secured, the space between said terminals constituting a gap in the circuit. Below said terminals 58 is a pair of stops 59 limiting the movement of the circuit closer in the direction to open the electric circuit. Said circuit closer comprises a cylindrical disk 60 rotatably mounted on a shaft 61 passing at its ends through the bifurcated ends of arms 62 and 63 respectively, the other ends of said arms being pivotally connected with ends of a pair of links 64 which at their other ends are pivotally connected with the free ends of the arms of a U-shaped member 65. The latter is suitably mounted on the upper end of a plunger 66 which between its ends passes through an opening in the bottom wall of the casing 67 inclosing said switch and through an opening in the arm of a bracket 69. The said plunger 66 is made in two parts one of which is threaded at one end and is equipped on said threaded portion with nuts 70 and 71 adapted to be adjusted thereon and to engage the lower and upper faces respectively, of the arm 68 of the other part to adjust the length of said plunger. At its other end said plunger 66 is pivotally secured to said lever 53 between the pivotal support 55 thereof and the counterweighted end 56, said connection being made relatively nearer the latter so that as said lever 53 turns on its pivot a relatively long stroke will be imparted to said plunger 66. Suitable springs 72 are secured at one end to said U-shaped member 65 and between their ends bear upon the pivots connecting said links 64 with said members 65 and at their other ends are connected with the pivots connecting said link 64 with the arms 62. Said springs serve to force the last-named ends of the links 64 normally toward each other so that as said member 65 is vertically reciprocated said springs will serve each time that the plane of the axes of the pivotal connections of the links 64 with the arms 62 passes the horizontal plane of the axis of the shaft 61 to throw said wheel 60 in a direction opposite to the direction of movement of said member 65. This movement is accomplished with extreme rapidity and suddenness thus opening and closing the motor circuit without danger of drawing an arc and causing a burning or melting away of the circuit closing contact surfaces. The circuit is further controlled by a manually operated switch 73 mounted on said plate 13.

In the apparatus hereinbefore described the motor and carbonator are disposed on respectively opposite sides of the pivotal axis of the carrying member so that the motor partly counterbalances the carbonator. This is preferable for the reason that it necessarily enables the size and weight of the counterweight 56 or the length of the lever 53 or both to be considerably reduced thereby decreasing the gross weight of the entire apparatus and also permitting the same to be made more compact.

In Figs. —4— and —5—, however, I have shown another way of carrying out my invention in which the motor 74 and carbonator 75 are simultaneously raised and lowered, the dished bottom of the carbonator being equipped with two pairs of downwardly extending projections 76 and 77 respectively, the former having a V-shaped recess in their lower ends and the latter having plane lower faces. The base 78 is provided with a peripheral flange 79 equipped with two pairs of opposed inwardly extending projections 80 and 81 respectively, all of which are provided in their upper faces with V-shaped recesses. The said projections 80 receive the knife-edge projections 82 extending outwardly from the arms of a U-shaped lever 83 between the ends thereof, the free ends of said arms being equipped with similar knife edge projections 84 adapted to enter the V-shaped recesses in the said projections 76, the respective knife edges of said projections 82 and 84 being oppositely disposed. A similar lever 85 is similarly pivotally mounted upon the projections 81 which receive the projections 86. The end projections 87 of said lever 85 receive the lower faces of the projections 77. The middle portions of said levers oppose each other and are maintained normally depressed by a counterweighted lever 88 pivotally secured at one end to a projection 89 of said flange 79 and bearing between its ends on the said middle portions of said levers 83 and 85, the free end portion of said lever 88 carrying the counterweight 90. In this construction the carbonator is raised and lowered without being tilted at any time but the movements of the parts are attended with greater friction and are, therefore, less easy and positive. Connection between the lever 88 and a circuit closer may be made in any desired manner, such connection being omitted from illustration.

To successfully carbonate liquids to the maximum degree it is primarily essential that the liquid to be carbonated shall be presented in a finely divided state to the carbonic acid gas so as to present as large a surface as possible to the latter. This is best accomplished by the means shown in Fig.

—1— but may also be accomplished by the means shown in Fig. —6— in which a tube or nozzle 91 equipped internally between its ends with a plurality of strainers 92 is employed, the latter being closed at its lower end and provided with a plurality of perforations 93 through which the liquid is discharged in very small jets. A slightly dished plate 94 is suspended in the path of the jets of liquid, the latter impinging on the same and producing a plurality of fan like sprays adapted to project the liquid outwardly in a finely divided state. The small drops of liquid are collected upon a circular corrugated plate 95 provided with a central opening 96 and inclined from its periphery toward said opening so that the liquid collecting upon the same will pass over said corrugations in very thin films and will thence pass through said central opening upon a circular dished corrugated plate 97 inclined downwardly toward its periphery and over which the liquid passes in similar thin films and from the periphery of which it will drop into the bottom of the carbonator. The thin films of liquid will, of course, be exposed to the action of the carbonic acid gas and will absorb the same so that it will become highly carbonated.

It will, of course, be understood that an electric motor constitutes the most convenient source of power for actuating the pump but that where an electric current is not available motors of any other suitable type may be substituted and in place of the circuit closure, herein shown and described, the plunger 66 and the member 65 and links and arms 64 and 62 respectively, connected therewith may be employed to control the power actuating a motor of any other type which may be employed.

The operation of my said apparatus is as follows: Assuming that the carbonator is filled and that it is now being gradually emptied by consumption of its contents the carbonator will be disposed at the lower limit of its movement and the counterweighted end of the lever 53 will be disposed in the upper limit of its movement. As the contents of the carbonator are withdrawn the weight of the latter gradually decreases and is finally overbalanced by the weight of the motor and the counterweight end of the lever 53. The carbonator moves gradually upwardly and thereby causes the weighted end of the lever 53 to move gradually downwardly thus drawing the plunger 66 in the same direction. As the pivotal connections of the links 64 with the arms 62 pass the horizontal plane of the shaft 61 of the wheel 60 which is at this time disposed at the lower limit of its movement in contact with the stops 59 the said wheel is suddenly moved upwardly into contact with the terminals 58. This closes the motor circuit and causes the motor to operate thereby actuating the pump and feeding fresh water to the carbonator, the latter is carbonated during its admission into the carbonator and when the level of the same in the latter has reached a given point so as to increase the weight of the carbonator to a degree sufficient to overbalance the counterweighted end of the lever 53 and the motor the carbonator will gradually sink thus causing the movement of the plunger 66 into opposite direction and when the latter has moved a distance sufficient to cause the pivotal connections of the links 64 with the arms 62 to again pass the horizontal plane of the axis of the shaft 61 the wheel 60 will be suddenly withdrawn from contact with the terminals 59 and the circuit thus suddenly opened thereby stopping the motor. This operation is repeated at intervals the frequency of which, as before stated, is dependent upon the rate of consumption of the carbonated liquid.

The operation is entirely automatic and is rendered absolutely positive by the action of the circuit closure.

It will be noted that every part of the apparatus is easily accessible for purposes of cleansing and repair and that reassembling and assembling the same may be accomplished by unskilled mechanics.

I claim as my invention:

1. An apparatus for carbonating liquids comprising a carbonating receptacle, a supply of carbonic acid gas connected therewith, a pump connected therewith, a motor actuating said pump, the latter and said motor rigid with said carbonating apparatus, a member supporting said last-named parts movably supported upon a base, a lever pivotally supported between its ends on said base and bearing at one end upon said supporting member to maintain the latter normally at the upper limit of its movement, a counterweight on the other end of said lever, and means controlling said motor actuated by a relative movement of one end of said lever and said supporting member.

2. In an apparatus for carbonating liquids, a supporting member pivotally supported upon a base and carrying the carbonator, the pump and the motor for actuating said pump, a lever pivotally supported between its ends upon said base and bearing at one end upon said support to maintain the carbonator normally at the upper limit of its movement, an adjustable counter-weight on the other end of said lever adapted to be over-balanced by the weight of said carbonator when filled with liquid and adapted when said carbonator is empty to turn said lever to raise the latter, means controlling said motor, and connection between said means and said lever for actuating the former.

3. In an apparatus for carbonating liquids, the combination with the carbonator, a pump for supplying liquid thereto and a motor for actuating said pump, a common support for all of said members movably mounted upon a base, a circuit closing member controlling the motor circuit, at least one spring actuated lever operatively connected with said circuit-closing member for throwing the same into and out of circuit closing position as said lever is moved in respectively opposite directions through a given plane, a lever fulcrumed between its ends upon said base, a counter-weight at one end of said lever, the other end thereof bearing upon said support for normally maintaining the carbonator at the upper limit of its movement, and a link connecting said last-named lever with said first-named lever for actuating the latter.

4. In a device of the kind specified, the combination with a receptacle for carbonated liquid, a pump supplying the same, a motor actuating said pump, and carrying means common to all of said parts, said carrying means pivotally supported, of a lever carrying a counterweight at one end and pivotally supported between its ends and bearing at its other end on said carrying means adapted to normally maintain said receptacle at the upper limit of its movement, means controlling the power actuating said motor, and connection between the same and said lever.

5. In a carbonator, a receptacle for carbonated liquid, a pump supplying the same, a motor actuating said pump, a pivotally supported member carrying said receptacle, a counterweighted lever normally maintaining said receptacle at the upper limit of its movement, means controlling the connection between said motor and its source of power, and connection between said means and said lever for controlling the former.

6. In a carbonator, the combination with the receptacle for carbonated liquid, a pump and a motor actuating the same, a common rocking support for all of said parts, the axis of said support disposed between the motor and said receptacle, and means controlling the connection of said motor with a source of power, of a lever pivotally supported adjacent one of its ends and bearing at said end on said rocking support, a counterweight on the other end of said lever, said lever acting to maintain said receptacle normally raised, and connection between the counterweighted end portion of said lever and said controlling means for actuating the latter to control said motor.

7. In a carbonator, a rocking carrying member comprising the bottom of the carbonating tank, and a platform for the motor, said member pivotally supported between its ends, whereby the said motor acts to partly counterbalance said receptacle, and a lever pivotally mounted between its ends below said rocking member and bearing at one end thereon, the other end of said lever equipped with a counterweight.

8. In a carbonating apparatus, the combination with a pivotally supported rocking member, the carbonator carried thereby at one end, a motor and a pump actuated thereby carried at the other end thereof, and a device controlling the connection of said motor and its source of power carried by said rocking member, of a counterbalancing lever engaging the carbonator end of said member to maintain the latter normally raised, and connection between said lever and said controlling device, the latter actuated by relative movement of said rocking member and said lever.

9. In a device of the kind specified, a carbonator adapted to be raised and lowered, a pump for supplying liquid thereto, a motor actuating said pump, the pump barrel and motor frame immovable relatively to said carbonator, and a device controlling the connection of said motor with its source of power, of a lever pivotally supported independently of said motor and associated parts, a counterweight on one end of said lever, operative connection between said lever and said carbonator for maintaining the latter normally at the upper limit of its movement, and connection between said lever and said controlling device, whereby relative movement between the same and said carbonator serves to actuate said controlling device.

10. In a device of the kind specified, the combination with the carbonator and its associated parts including a pump, a motor actuating the same, and a device controlling the connection of said motor with its source of power, all of said parts movably supported and immovable relatively to each other, of a counterweighted lever actuated by variations in the volume of liquid contents in said carbonator, and connection between said lever and said controlling device for actuating the latter.

11. In a carbonator, inlets for gas and liquid respectively, the latter terminating in a nozzle provided with a plurality of perforations from which jets of liquid are discharged, and a projection disposed in the path of each of said respective jets of liquid for deflecting and finely dividing said liquid, each of said projections having the surface impinged upon disposed at a different elevation from all of the others.

12. In a carbonator, an inlet for liquid through the top thereof, a nozzle within the same provided in its upper face with perforations through which jets of liquid are discharged toward the top of same, a deflecting surface disposed in the path of each of said respective jets of liquid and adapted to deflect and finely divide the same, each of said surfaces disposed at a different elevation from all of the others.

In testimony whereof I have signed my name in presence of two subscribing witnesses.

RUDOLPH MUELLER.

Witnesses:
 RUDOLPH WM. LOTZ,
 W. M. BOYLE.